United States Patent
Xie et al.

(10) Patent No.: US 11,261,369 B2
(45) Date of Patent: Mar. 1, 2022

(54) MALEIC ANHYDRIDE COPOLYMER WITH BROADLY DISPERSED ESTER SIDE CHAIN AS WAX INHIBITOR AND WAX CRYSTALLIZATION ENHANCER

(71) Applicant: BL Technologies, Inc., Minnetonka, MN (US)

(72) Inventors: Xiaoan Xie, Shanghai (CN); Wenqing Peng, Shanghai (CN); Hitesh Ghanshyam Bagaria, The Woodlands, TX (US); Nimeshkumar Kantilal Patel, The Woodlands, TX (US)

(73) Assignee: BL Technologies, Inc., Minnetonka, MN (US)

( * ) Notice: Subject to any disclaimer, the term of this patent is extended or adjusted under 35 U.S.C. 154(b) by 172 days.

(21) Appl. No.: 16/497,872

(22) PCT Filed: Apr. 6, 2018

(86) PCT No.: PCT/CN2018/082088
§ 371 (c)(1),
(2) Date: Sep. 26, 2019

(87) PCT Pub. No.: WO2018/188523
PCT Pub. Date: Oct. 18, 2018

(65) Prior Publication Data
US 2020/0024504 A1      Jan. 23, 2020

(30) Foreign Application Priority Data

Apr. 13, 2017 (CN) .......................... 201710240505.9
Dec. 27, 2017 (WO) ....................... PCT/US17/68460

(51) Int. Cl.
C08F 222/06    (2006.01)
C09K 8/524     (2006.01)
C08F 210/14    (2006.01)
C08F 8/14      (2006.01)
F17D 1/16      (2006.01)

(52) U.S. Cl.
CPC ............... C09K 8/524 (2013.01); C08F 8/14 (2013.01); C08F 210/14 (2013.01); C08F 222/06 (2013.01); C08F 2810/50 (2013.01); F17D 1/16 (2013.01)

(58) Field of Classification Search
CPC ......... C08F 8/14; C08F 210/14; C08F 222/06
See application file for complete search history.

(56) References Cited

U.S. PATENT DOCUMENTS

| 2,892,793 A | 6/1959 | Stewart |
| 2,977,334 A | 3/1961 | Zopf |
| 3,449,236 A | 6/1969 | Engelhart |
| 3,449,250 A | 6/1969 | Fields |
| 3,694,176 A | 9/1972 | Miller |
| 3,854,893 A | 12/1974 | Rossi |
| 3,966,428 A | 6/1976 | Rossi |
| 3,984,368 A | 10/1976 | Teer et al. |
| 4,151,069 A | 4/1979 | Rossi |
| 4,166,900 A * | 9/1979 | Heimsch ............ A61P 3/06 528/491 |
| 4,171,273 A | 10/1979 | Waldbillig et al. |
| 4,240,916 A | 12/1980 | Rossi |
| 4,261,703 A | 4/1981 | Tack et al. |
| 4,514,314 A * | 4/1985 | Rossi ............ C10M 145/16 508/468 |
| 4,548,725 A | 10/1985 | Bridger |
| 4,693,838 A | 9/1987 | Varma et al. |
| 4,839,074 A | 6/1989 | Rossi et al. |
| 4,861,818 A | 8/1989 | Timmerman et al. |
| 4,871,823 A | 10/1989 | Billman et al. |
| 4,891,145 A | 1/1990 | Brod et al. |
| 4,900,461 A | 2/1990 | Ver Strate et al. |
| 4,954,572 A | 9/1990 | Emert et al. |
| 5,041,622 A | 8/1991 | LeSuer |
| 5,366,649 A | 11/1994 | Durand et al. |
| 5,441,545 A | 8/1995 | Lewtas et al. |
| 5,703,023 A | 12/1997 | Srinivasan |
| 5,792,729 A | 8/1998 | Harrison et al. |
| 5,857,287 A | 1/1999 | Schield et al. |

(Continued)

FOREIGN PATENT DOCUMENTS

| CN | 1037854 C | 12/1989 |
| CN | 1064305 A | 9/1992 |

(Continued)

OTHER PUBLICATIONS

English translation of JP 2005-258090 (Year: 2005).*

(Continued)

*Primary Examiner* — Robert C Boyle
(74) *Attorney, Agent, or Firm* — Armstrong Teasdale LLP

(57) ABSTRACT

A wax inhibitor composition, the composition having at least one alpha-olefin maleic anhydride copolymer of the formula:

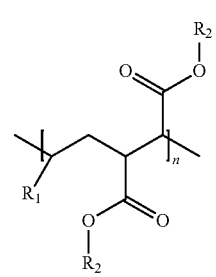

wherein $R_1$ is selected from hydrocarbyl groups containing 10-30 carbon atoms, and $R_2$ is selected from a hydrogen or hydrocarbyl groups containing 10-80 carbon atoms, and $R_2$, if not hydrogen, is broadly dispersed, wherein $R_2$ comprises a weight fraction of carbon numbers greater than 30, wherein $R_2$ can be the same or different, and n is a number of repeating units ranging from 1 to 100.

25 Claims, 4 Drawing Sheets

(56) References Cited

U.S. PATENT DOCUMENTS

| | | | |
|---|---|---|---|
| 6,015,863 | A | 1/2000 | Mike et al. |
| 6,174,843 | B1 | 1/2001 | Peyton et al. |
| 6,475,963 | B1 | 11/2002 | Bloch et al. |
| 6,715,473 | B2 | 4/2004 | Ritchie et al. |
| 7,067,599 | B2 | 6/2006 | Tack et al. |
| 7,144,951 | B2 | 12/2006 | Duyck et al. |
| 7,198,103 | B2 | 4/2007 | Campbell |
| 7,500,522 | B2 | 3/2009 | Skibinski et al. |
| 7,745,541 | B2 | 6/2010 | Ruhe, Jr. et al. |
| 7,816,309 | B2 | 10/2010 | Stokes et al. |
| 7,820,604 | B2 | 10/2010 | Ruhe, Jr. et al. |
| 7,820,605 | B2 | 10/2010 | Stokes et al. |
| 7,833,955 | B2 | 11/2010 | Burrington et al. |
| 7,858,566 | B2 | 12/2010 | Ruhe, Jr. et al. |
| 7,928,044 | B2 | 4/2011 | Stokes et al. |
| 7,942,941 | B2 | 5/2011 | Cravey et al. |
| 8,067,347 | B2 | 11/2011 | Ruhe, Jr. et al. |
| 8,455,568 | B2 | 6/2013 | Ruhe, Jr. |
| 8,557,753 | B2 | 10/2013 | Gieselman et al. |
| 2004/0101775 | A1 | 5/2004 | Mikuriya et al. |
| 2004/0110647 | A1 | 6/2004 | Gapinski |
| 2005/0124509 | A1 | 6/2005 | Gutierrez et al. |
| 2010/0130385 | A1 | 5/2010 | Guzmann et al. |
| 2011/0190438 | A1 | 8/2011 | Rodriguez Gonzalez et al. |
| 2013/0186629 | A1 | 7/2013 | Leonard et al. |
| 2013/0310290 | A1 | 11/2013 | Price et al. |
| 2014/0048273 | A1 | 2/2014 | Southwick et al. |
| 2014/0250771 | A1 | 9/2014 | Biggerstaff et al. |
| 2014/0260567 | A1 | 9/2014 | Fouchard et al. |
| 2016/0115369 | A1 | 4/2016 | Soriano, Jr. et al. |

FOREIGN PATENT DOCUMENTS

| | | | |
|---|---|---|---|
| CN | 1965064 | A | 5/2007 |
| CN | 100439404 | C | 12/2008 |
| CN | 101381640 | B | 3/2009 |
| CN | 101544735 | A | 9/2009 |
| CN | 101668828 | A | 3/2010 |
| CN | 101812348 | B | 8/2010 |
| CN | 101870750 | A | 10/2010 |
| CN | 101899162 | A | 12/2010 |
| CN | 101921377 | A | 12/2010 |
| CN | 102108292 | A | 6/2011 |
| CN | 102191093 | A | 9/2011 |
| CN | 102382695 | A | 3/2012 |
| CN | 102533241 | B | 7/2012 |
| CN | 103450955 | B | 12/2013 |
| CN | 103642477 | A | 3/2014 |
| CN | 104245906 | A | 12/2014 |
| CN | 104371058 | A | 2/2015 |
| CN | 104693344 | A | 6/2015 |
| CN | 104694181 | A | 6/2015 |
| EP | 172906 | B2 | 12/1992 |
| EP | 677572 | B1 | 1/1999 |
| EP | 1746147 | A1 | 1/2007 |
| JP | S62003200 | B2 | 1/1987 |
| JP | 02919861 | B2 | 7/1999 |
| JP | 2005-258090 | * | 9/2005 |
| JP | 2008308660 | A | 12/2008 |
| JP | 2011122135 | A | 6/2011 |
| JP | 05356971 | B2 | 12/2013 |
| WO | 2008125588 | A1 | 10/2008 |
| WO | 2011079508 | A1 | 7/2011 |
| WO | 2014165532 | A1 | 10/2014 |

OTHER PUBLICATIONS

International Search Report and Written Opinion in related International Application No. PCT/CN2018/082088 dated Jul. 11, 2018; 9 pages.

International Search Report and Written Opinion in related International Application No. PCT/US2017/068460 dated May 8, 2018; 12 pages.

"Octadecylsuccinic acid | C22H42O4", PubChem Compound, Aug. 8, 2005, NCBI Database accession No. CID 110691, XP002801616, Retrieved from the Internet: URL: https://pubchem.ncbi.nlm.nih.gov/compound/110691.

"UNILIN Alcohols", Web Article, 2011, Baker Hughes Incorporated, 2 pages.

Xing Shili et al.: "Effect of Maleic Anhydride Copolymer on Cold Flow Ability of Waxy Oils", Jun. 2011, Chinese Journal of Colloids and Polymers, vol. 29, No. 2, DOI: 10.3969/j.issn.1009-1815.2011.02.010. English abstract only.

Extended European Search Report for European Application No. 18783759.6, dated Feb. 16, 2021, 7 pages.

* cited by examiner

MALEIC ANHYDRIDE COPOLYMER WITH BROADLY DISPERSED ESTER SIDE CHAIN AS WAX INHIBITOR AND WAX CRYSTALLIZATION ENHANCER

CROSS-REFERENCE TO RELATED APPLICATION

This application is a national phase of International Patent Application No. PCT/CN2018/082088 filed Apr. 6, 2018, which claims the priority benefit of Chinese Patent Application Serial No. 201710240505.9 filed Apr. 13, 2017 and PCT Application No. PCT/US17/068460 filed Dec. 27, 2017.

FIELD OF INVENTION

The disclosed technology generally described hereinafter provides for maleic anhydride copolymers with broadly dispersed ester side chains, and more specifically, to maleic anhydride copolymers with broadly dispersed ester side chains formed from alcohols with more than 25% by weight of alcohols containing greater than 35 carbon atoms.

BACKGROUND OF THE INVENTION

In production of most wax-containing oils such as crude oils, a major problem occurs when the oil temperature is below the solidification temperature of the wax in the oil, because the wax solidifies and tends to precipitate out and deposit on the piping and other equipment contacted by the oil. Build-up of wax deposits can impact oil production throughput due to reduced effective pipe diameter, also associate with accelerated corrosion. Moreover, wax deposition may cause the oil to lose its ability to flow, and thus cause difficulties in transporting the oil through lines and pumps.

Comb polymers are widely used as wax inhibitors and pour point depressants in oil production and transportation to interfere with the wax crystallization process to reduce deposit amounts and/or improve crude flowability at temperatures below wax appearance temperature. The performance of comb polymers are affected by the varying lengths and proportions of wax alkane chains that are found from crude to crude.

A challenge encountered in the oil production industry is how to efficiently treat crudes that contain very long waxes (i.e. C40+). Currently, there is no efficient way to treat these long waxes because there is no cost-effective, synthetic way to introduce equally long alkyl chains into a comb polymer.

In the upstream industry, additional challenges are encountered, which include how to treat crudes containing heavy wax (high MW wax or high Cn wax, normally defined as >C35 paraffin) to inhibit the wax deposition, as well as how to create a single product that works efficiently for all crudes.

SUMMARY OF THE INVENTION

The disclosed technology generally described hereinafter provides for maleic anhydride copolymers with broadly dispersed ester side chains, and more specifically, to maleic anhydride copolymers with broadly dispersed ester side chains formed from alcohols with more than 25% by weight of alcohols containing greater than 35 carbon atoms.

In one aspect of the present technology, a wax inhibitor composition is provided. The wax inhibitor composition comprises at least one alpha-olefin maleic anhydride copolymer of the formula

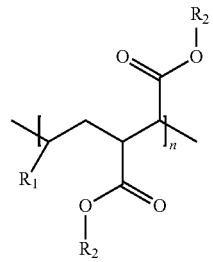

wherein $R_1$ is selected from hydrocarbyl groups containing 10-30 carbon atoms, and $R_2$ is selected from a hydrogen or hydrocarbyl groups containing 10-80 carbon atoms, and $R_2$, if not hydrogen, is broadly dispersed, wherein $R_2$ comprises a weight fraction of carbon numbers greater than 30, wherein $R_2$ can be the same or different, and n is a number of repeating units ranging from 1 to 100.

In some embodiments, the at least one alpha olefin maleic anhydride copolymer is prepared by reacting an alpha-olefin containing greater than 10 carbon atoms with maleic anhydride in the presence of a free radical initiator to obtain a high molecular weight copolymer, followed by reacting the high molecular weight copolymer with an alcohol mixture having a dispersed chain length ranging from 10 to 80 carbon atoms.

In some embodiments, the alpha-olefin comprises a range of about 10-30 carbon atoms. In some embodiments, the alpha-olefin comprises at least 18 carbon atoms. In some embodiments, the alpha-olefin is 1-octadecene, 1-eicosene, 1-docosene, 1-tetracosene, 1-hexacosene, 1-octacosene, 1-hexadecene, 1-tetradecane, or 1-dodecene.

In some embodiments, the alcohol mixture contains more than 25% by weight of alcohols in the alcohol mixture contain greater than 35 carbon atoms.

In some embodiments, the alcohol mixture has a dispersed chain length ranging from C10-C60. In some embodiments, the alcohol mixture has a dispersed chain length ranging from C20-C70. In some embodiments, the alcohol mixture has a dispersed chain length ranging from C30-C80.

In some embodiments, the alcohol mixture comprises a linear aliphatic alcohol containing more than 25% by weight of alcohols in the alcohol mixture contain greater than 35 carbon atoms.

In yet another aspect of the present technology, a comb polymer composition is provided. The comb polymer composition comprises at least one alpha olefin maleic anhydride copolymer of the formula

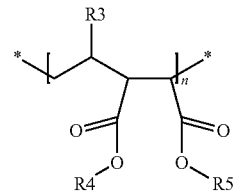

wherein $R_3$ is selected from hydrocarbyl groups containing 10-40 carbon atoms, and $R_4$ is selected from a hydrogen or hydrocarbyl groups containing 10-80 carbon atoms, and $R_4$, if not hydrogen, is broadly dispersed, wherein $R_4$ comprises a weight fraction of carbon numbers greater than 30, $R_5$ is selected from a hydrogen or hydrocarbyl groups containing 10-80 carbon atoms, and $R_5$, if not hydrogen, is broadly dispersed, wherein $R_5$ comprises a weight fraction of carbon numbers greater than 30, wherein $R_4$ and $R_5$ are the same or different, and n is a number of repeating units ranging from 1 to 100.

In some embodiments, the at least one alpha olefin maleic anhydride copolymer is prepared by reacting an alpha-olefin or alpha-olefin mixture with a chain length of greater than 24 carbon atoms with a dicarboxylic acid to obtain a copolymer, followed by reacting the copolymer with an alcohol mixture in the presence of a catalyst, wherein the alcohol mixture contains a fully saturated, linear primary alcohol, having a dispersed chain length ranging from 10 to 80 carbon atoms.

In some embodiments, the alpha-olefin is 1-octadecene, 1-eicosene, 1-docosene, 1-tetracosene, 1-hexacosene, 1-octacosene, or 1-hexadecene, 1-tetradecane, 1-dodecene, or C30-54 olefin.

In some embodiments, the dicarboxylic acid is maleic anhydride. In some embodiments, the alcohol mixture contains more than 25% by weight of alcohols in the alcohol mixture contain greater than 35 carbon atoms.

In some embodiments, the alcohol mixture has a dispersed chain length ranging from C10-C60. In some embodiments, the alcohol mixture has a dispersed chain length ranging from C20-C70. In some embodiments, the alcohol mixture has a dispersed chain length ranging from C30-C80.

In some embodiments, the alpha-olefin has a chain length of between 24-28 carbon atoms and the alcohol mixture has a dispersed chain length of greater than 25 carbon atoms. In some embodiments, the alpha-olefin has a chain length of greater than 30 carbon atoms and the alcohol mixture has a dispersed chain length of greater than 30 carbon atoms. In some embodiments, the alpha-olefin has a chain length of greater than 30 carbon atoms and the alcohol mixture has a dispersed chain length of greater than 40 carbon atoms.

In some embodiments, the comb polymer composition is used to effectively treat crudes comprising long waxes containing greater than 40 carbon atoms.

In some embodiments, approximately 50-200% of the dicarboxylic acid is esterified with the alcohol mixture.

In yet another aspect of the present disclosure, a method of reducing wax deposition from an oil is provided. The method comprises adding to the oil an effective amount of a wax inhibitor composition comprising at least one alpha olefin maleic anhydride copolymer, wherein the at least one alpha olefin maleic anhydride copolymer is prepared by reacting an alpha-olefin containing greater than 10 carbon atoms with maleic anhydride in the presence of a free radical initiator to obtain a high molecular weight copolymer, followed by reacting the high molecular weight copolymer with an alcohol mixture having a dispersed chain length ranging from 10 to 80 carbon atoms.

In some embodiments, the at least one alpha olefin maleic anhydride copolymer of the formula:

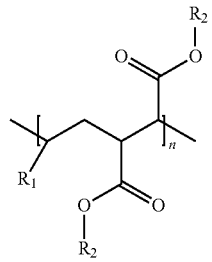

wherein $R_1$ is selected from hydrocarbyl groups containing 10-30 carbon atoms, and $R_2$ is selected from a hydrogen or hydrocarbyl groups containing 10-80 carbon atoms, and $R_2$, if not hydrogen, is broadly dispersed, wherein $R_2$ comprises a weight fraction of carbon numbers greater than 30, wherein $R_2$ can be the same or different, and n is a number of repeating units ranging from 1 to 100.

In some embodiments, the at least one alpha olefin maleic anhydride copolymer of the formula:

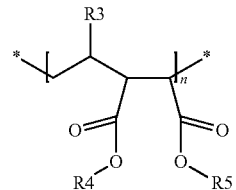

wherein $R_3$ is selected from hydrocarbyl groups containing 10-40 carbon atoms, and $R_4$ is selected from a hydrogen or hydrocarbyl groups containing 10-80 carbon atoms, and $R_4$, if not hydrogen, is broadly dispersed, wherein $R_4$ comprises a weight fraction of carbon numbers greater than 30, $R_5$ is selected from a hydrogen or hydrocarbyl groups containing 10-80 carbon atoms, and $R_5$, if not hydrogen, is broadly dispersed, wherein $R_5$ comprises a weight fraction of carbon numbers greater than 30, wherein $R_4$ and $R_5$ are the same or different, and n is a number of repeating units ranging from 1 to 100.

In some embodiments, the alcohol mixture contains more than 25% by weight of alcohols in the alcohol mixture contain greater than 35 carbon atoms. In some embodiments, the oil comprises long waxes containing greater than 40 carbon atoms.

In some embodiments, the weight percent of the high molecular weight copolymer in the wax inhibitor composition is in a range from 0.1% to 100%. In some embodiments, the oil comprises a wax content of 0.1% to 100% by weight. In some embodiments, the oil is a crude oil having a wax content of 0.1% to 100%. In some embodiments, the weight percentage of the wax inhibitor in the crude oil is in a range from 0.001% to 1%.

BRIEF DESCRIPTION OF THE DRAWINGS

These and other features of the disclosed technology, and the advantages, are illustrated specifically in embodiments now to be described, by way of example, with reference to the accompanying diagrammatic drawings, in which.

DETAILED DESCRIPTION OF EXEMPLARY EMBODIMENTS

Figure 1:
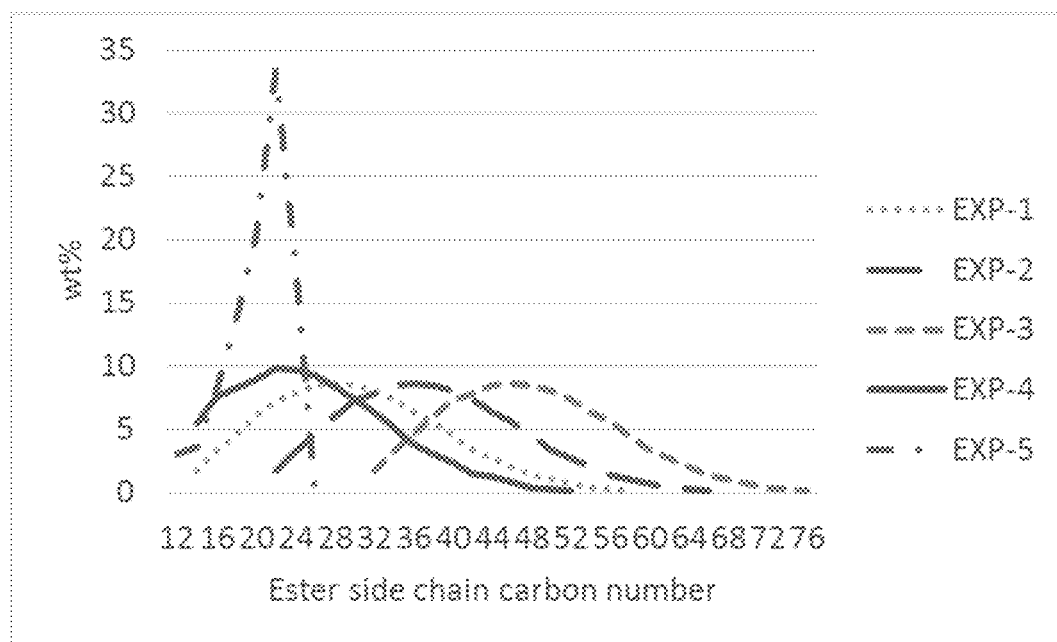
FIG. 1 is a graph providing results of an illustrative embodiment of the disclosed technology.

The disclosed technology generally to maleic anhydride copolymers with broadly dispersed ester side chains, where these novel copolymers can be used as wax inhibitors or wax crystallization enhancers. The disclosed technology provides novel copolymers that can be used to treat a broad range of crudes containing short or long waxes, and is especially successful in treating crudes containing very long waxes (C40+).

The maleic anhydride copolymers contain broadly dispersed ester side chains on a carbon number, where "broadly dispersed" can be understood to mean as having both short and very long side chains. The broadly dispersed ester side chains provide a significant benefit of the copolymer performance, especially on crudes containing heavy wax, and on applications that enhance wax crystallization. By obtaining the broadly dispersed ester side chains, the copolymers of the present technology can be used with both crudes containing very long waxes, as well as for a broad range of crudes. This is significant as these copolymers can reduce the burden of preparing a range of comb polymers for wax treatment since many comb polymers only work for a narrow range of crudes.

The broadly dispersed ester side chains of the present technology are formed by using a select group of alcohols that are fully saturated, long chain, linear alcohols. These alcohols are of high molecular weight, have greater crystallinity, and have a high purity with high (e.g. >80%) primary alcohol concentration. The alcohols used to build the ester side chains of the copolymers of the present technology contain an especially significant heavy fraction, that is more than 25% by weight of the alcohol contains greater than 35 carbon atoms.

In some embodiments, a wax inhibitor composition is provided. The wax inhibitor composition comprises at least one alpha-olefin maleic anhydride copolymer. In some embodiments, the alpha-olefin maleic anhydride copolymer is represented by the formula:

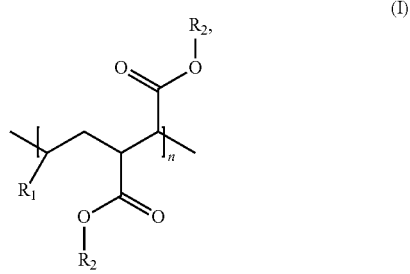

(I)

wherein $R_1$ is selected from hydrocarbyl groups containing 10-30 carbon atoms, and $R_2$ is selected from a hydrogen or hydrocarbyl groups containing 10-80 carbon atoms, and $R_2$, if not hydrogen, is broadly dispersed, wherein $R_2$ comprises a weight fraction of carbon numbers greater than 30, wherein $R_2$ can be the same or different, and n is a number of repeating units ranging from 1 to 100.

As used herein the term "hydrocarbyl" refers to any combination of straight-chain, branched-chain, or cyclic alkyl, alkenyl, alkynyl, aryl groups, or the respective group substituted with one or more substituents, including, but not limited to, groups such as alkyl, alkenyl, alkynyl, aryl, cycloalkyl groups and any combination thereof.

The alpha-olefin maleic anhydride copolymer of the wax inhibitor composition is prepared by reacting an alpha-olefin containing greater than 10 carbon atoms with maleic anhydride in the presence of a free radical initiator (such as dicumylperoxide, but other free radical initiators are useful in this context of the present technology and are known to those skilled in the art) to obtain a high molecular weight copolymer. In some embodiments, a Lewis-acid catalyst may be present.

The high molecular weight copolymer may be made by any of the methods known in the art, e.g. by solution polymerization with free radical initiation. The high molecular weight copolymer is subsequently reacted with an alcohol mixture having a dispersed chain length ranging from 10 to 80 carbon atoms in order to build the ester side chains present. However, it should be understood that all linear aliphatic alcohols containing a significant heavy fraction (e.g. >25 wt % of Cn>35) can be used to achieve the effect of the present technology. Additionally, subsequent to the formation of the alpha-olefin maleic anhydride copolymers of the present technology, the separation or pouring into cold alcohols to precipitate pure polymer is not necessary.

In some embodiments, the alpha-olefin comprises a range of about 10-30 carbon atoms. In other embodiments, the alpha-olefin comprises at least 18 carbon atoms. In some embodiments, the alpha-olefin is 1-octadecene, 1-eicosene, 1-docosene, 1-tetracosene, 1-hexacosene, 1-octacosene, 1-hexadecene, 1-tetradecane, or 1-dodecene. In a specific embodiment, the alpha-olefin is 1-octadecene.

In some embodiments, the alcohol mixture refers to a C10-C80 alcohol blend with an average number of carbon atoms in a range from 25 to 50. Each of alcohols in the alcohol mixture contains 10 to 80 carbon atoms, while the alcohols in the alcohol mixture are proportioned for the alcohol mixture contain more than 25% by weight of alcohols in the alcohol mixture contain greater than 35 carbon atoms.

In some embodiments, the alcohol mixture includes at least one C10-C80 alcohol blend. In some embodiments, the alcohol mixture includes at least two C10-C80 alcohol blends.

In some embodiments, the alcohol mixture has a dispersed chain length ranging from C10-C60. In some embodiments, the alcohol mixture has a dispersed chain length ranging from C20-C70. In some embodiments, the alcohol mixture has a dispersed chain length ranging from C30-C80.

In yet another embodiment, a comb polymer composition is provided. The comb polymer composition of the present technology can be used to effectively treat crudes comprising long waxes containing greater than 40 carbon atoms and is more effective than other commercial additives.

The comb polymer composition comprises at least one alpha-olefin maleic anhydride copolymer. In some embodiments, the alpha-olefin maleic anhydride copolymer is represented by the formula:

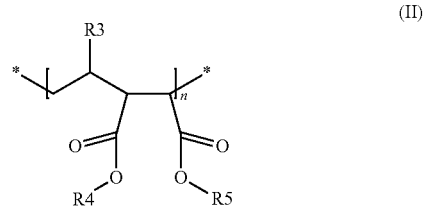

(II)

wherein $R_3$ is selected from hydrocarbyl groups containing 10-40 carbon atoms, and $R_4$ is selected from a hydrogen or hydrocarbyl groups containing 10-80 carbon atoms, and $R_4$, if not hydrogen, is broadly dispersed, wherein $R_4$ comprises a weight fraction of carbon numbers greater than 30, $R_5$ is selected from a hydrogen or hydrocarbyl groups containing 10-80 carbon atoms, and $R_5$, if not hydrogen, is broadly dispersed, wherein $R_5$ comprises a weight fraction of carbon numbers greater than 30, wherein $R_4$ and $R_5$ are the same or different, and n is a number of repeating units ranging from 1 to 100.

In some embodiments, the comb polymer composition can also be used as wax enhancer in some applications where accelerated wax crystallization is desired. One example of such applications is oil de-waxing. In such applications, wax crystal formation is preferred as wax is an important industrial raw material, and a de-waxed oil, which has better low temperature flowability, is useful in many areas.

The alpha-olefin maleic anhydride copolymer of the comb polymer composition is prepared by reacting an alpha-olefin or alpha-olefin mixture with a chain length of greater than 10 carbon atoms with a dicarboxylic acid to obtain a copolymer, followed by reacting the copolymer with an alcohol mixture in the presence of a catalyst, wherein the alcohol mixture contains a fully saturated, linear primary alcohol, having a dispersed chain length ranging from 10 to 80 carbon atoms.

In some embodiments, the alpha-olefin is 1-octadecene, 1-eicosene, 1-docosene, 1-tetracosene, 1-hexacosene, 1-octacosene, or 1-hexadecene, 1-tetradecane, 1-dodecene, or C30-54 olefin.

In some embodiments, the dicarboxylic acid is maleic anhydride. In some embodiments, approximately 50-200% of the dicarboxylic acid is esterified with the alcohol mixture, where the alcohol mixture contains more than 25% by weight of alcohols in the alcohol mixture contain greater than 35 carbon atoms.

In some embodiments, the alpha-olefin has a chain length of between 24-28 carbon atoms and the alcohol mixture has a dispersed chain length of greater than 25 carbon atoms. In some embodiments, the alpha-olefin has a chain length of greater than 30 carbon atoms and the alcohol mixture has a dispersed chain length of greater than 30 carbon atoms. In some embodiments, the alpha-olefin has a chain length of greater than 30 carbon atoms and the alcohol mixture has a dispersed chain length of greater than 40 carbon atoms.

In some embodiments, the comb polymer composition is added in a range of about 500 ppm of the waxy oil. In other embodiments, the comb polymer composition is added in a range of about 100 ppm of the waxy oil, and in other embodiments, about 2000 ppm of the waxy oil.

In yet another embodiment, a method of reducing wax deposition from an oil is provided. The oil comprises long waxes containing greater than 40 carbon atoms. In some embodiments, the oil comprises a wax content of 0.1% to 100% by weight. In some embodiments, the oil is a crude oil having a wax content of 0.1% to 100%. In such embodiments, wherein the weight percentage of the wax inhibitor in the crude oil is in a range from 0.001% to 1%.

The method comprises adding to the oil an effective amount of a wax inhibitor composition, where the wax inhibitor composition comprises an alpha-olefin maleic anhydride copolymer. The alpha-olefin maleic anhydride copolymer of the wax inhibitor composition is prepared by reacting an alpha-olefin containing greater than 10 carbon atoms with maleic anhydride in the presence of a free radical initiator to obtain a high molecular weight copolymer, followed by reacting the high molecular weight copolymer with an alcohol mixture having a dispersed chain length ranging from 10 to 80 carbon atoms.

In some embodiments, the alpha-olefin maleic anhydride copolymer is represented by Formula (I) described above, and in other embodiments, the alpha-olefin maleic anhydride copolymer is represented by Formula (II) described above. In some embodiments, wherein the weight percent of the high molecular weight copolymer in the wax inhibitor composition is in a range from 0.1% to 100%.

EXAMPLES

The present invention will be further described in the following examples, which should be viewed as being illustrative and should not be construed to narrow the scope of the invention or limit the scope to any particular invention embodiments.

Table 1 provides a description of the experimental examples and commercial products, where mol % is mol ratio of alcohols to maleic anhydride, theoretically the mol % range can be 0-200% as there are two carboxylic acid moiety on maleic anhydride. FIG. 1 provides the ester side chain carbon number distribution of the experimental chemicals.

TABLE 1

| Product | Olefin | Alcohols |
|---|---|---|
| EXP-1 | 1-octadecene | 100 mol % C10-60 alcohol, with 28 wt % of alcohols heavier than C35 |
| EXP-2 | 1-octadecene | 100 mol % C20-70 alcohol, with 69 wt % of alcohols heavier than C35 |
| EXP-3 | 1-octadecene | 100 mol % C30-80 alcohol, with 98 wt % of alcohols heavier than C35 |
| EXP-4 | 1-octadecene | 100 mol % C10-50 alcohol, with 14 wt % of alcohols heavier than C35 |
| EXP-5 | 1-octadecene | 100 mol % C14-26 alcohol |
| Commercial-1 | NA | C18-22 alcohol |
| Commercial-2 | C24-28 | C20-28 alcohol |

Wax Deposition Inhibition

Wax deposition inhibitions of these samples were evaluated on PSL CF-15 cold finger or self-designed cold finger following industrial standard cold finger testing protocol, using Surrogate oils (Exxon Mobile Aromatic 150/Exxsol D60 blends provided with commercial waxes), Doctored crudes (non-waxy crudes provided with about 5 wt % Wako44 commercial wax and 5 wt % Wako68 commercial wax) and real crudes.

Pour Point Depression

A summary of the cold finger test results of these samples are summarized in Table 2 below.

TABLE 2

| Crude | WAT/PP/wax %/API/nC40+ | Dosage (ppm active) | Commercial-1 | EXP-1 | EXP-2 | EXP-3 |
|---|---|---|---|---|---|---|
| China Crude 1 | 51.5/32/17.5%/33.7/3.1 | 400 | 14% | 40% | 33% | 37% |
| China Crude 2 | 66.7/55/32.3%/37/3.2 | 400 | −5% | −7% | 41% | 4% |
|  |  | 1000 | −10% | 35% | 83% | ND |
| China Crude 3 | 22.1/8/11.2%/38.3/0 | 400 | 45% | 48% | −165% | −160% |

As shown in Table 2, the experimental chemistry significantly inhibit wax deposition in cold finger test in two crudes containing very long waxes (>3% nC40+), while Commercial-1 is not responsive. Tuning chemistry can also make the experimental chemicals act as wax enhancer to promote wax crystallization in crude with low WAT, as can be seen by the results from EXP-2/3 on China Crude 3 crude.

Maleic Anhydride Copolymers

Figure 2:
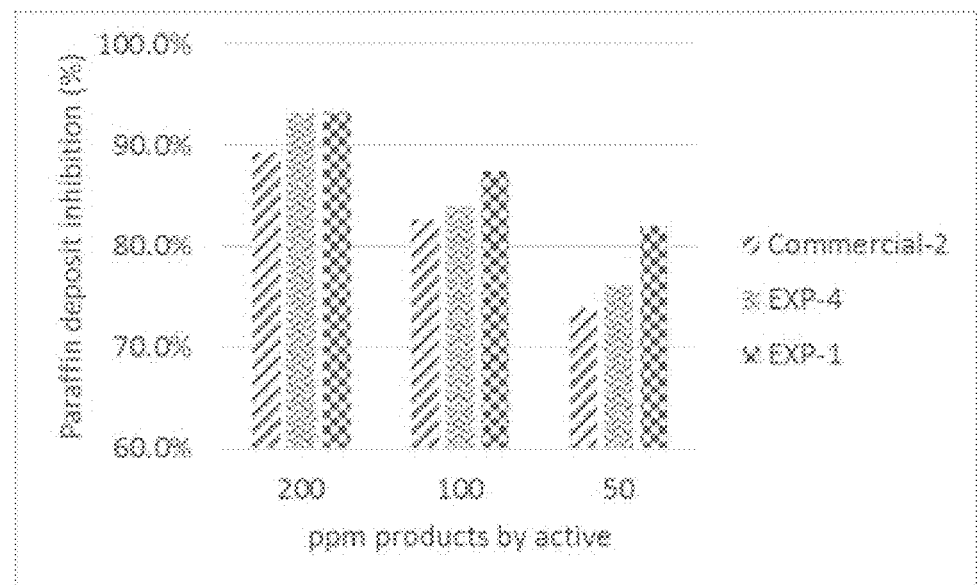
FIG. 2 is a graph providing results of an illustrative embodiment of the disclosed technology.

It was clearly shown that the maleic anhydride copolymers with the dispersed ester side chains of the present disclosure (e.g. the polymers with C10-80 alcohol side chains) showed improved performance over all commercial additives. FIG. 2 provides the cold finger test results where the oil is characterized as 5% Wako44 wax+5% Wako68 wax in D60/A150 (7/3 v/v), WAT 33.8° C., wax content: 10%. The cold finger was run at 35/25° C., 200 rpm, 4 hrs, 60 g oil. As can be seen in FIG. 2, both EXP-1 and EXP-4 showed improved performance over commercial additive (i.e. Commercial-2).

Figure 3:
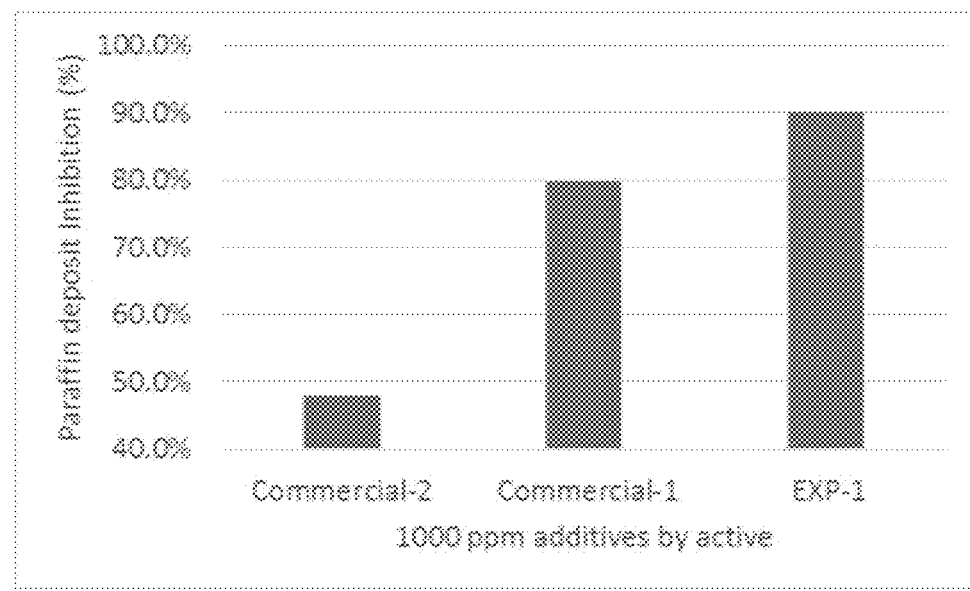
FIG. 3 is a graph providing results of an illustrative embodiment of the disclosed technology.

FIG. 3 provides the cold finger test results of the EXP-1 copolymer in China Crude 4 crude (WAT ~47° C., PP 30° C., wax content: 41.3 wt %). The cold finger was run at $T_{bath}$ 45° C., $T_{cool}$ 30° C., 4 hrs. It was shown that EXP-1 showed improved performance over all commercial additives (i.e. Commercial-1, Commercial-2) on this heavy waxy oil.

Figure 4:
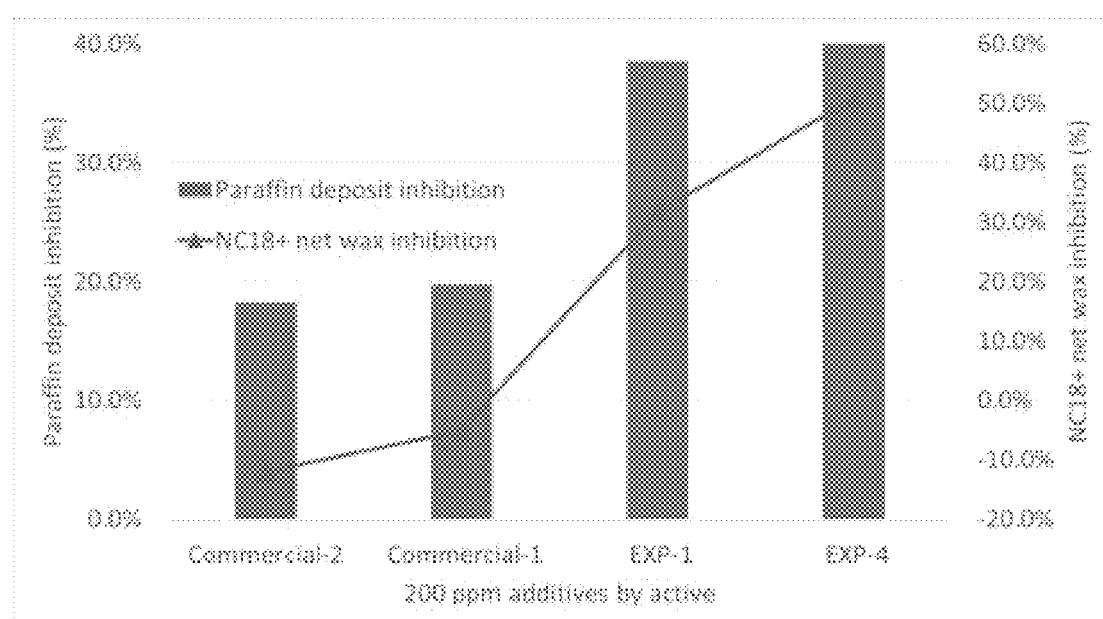
FIG. 4 is a graph providing results of an illustrative embodiment of the disclosed technology.

FIG. 4 provides the cold finger test results and nC18+ net wax inhibition percent measured by HTGC for both EXP-1 and EXP-4 copolymers. The oil was China Crude 5 crude (WAT 35.3° C., nC18+ wt % 30.6%). The cold finger was run at 37/22° C., 300 rpm, 20 hrs, 40 g oil, 200 ppm active chemical. It was shown that both EXP-1 and EXP-4 showed improved performance over all the commercial additives (e.g. Commercial-1, Commercial-2) in both deposition inhibition and nC18+ net wax inhibition.

Figure 5:
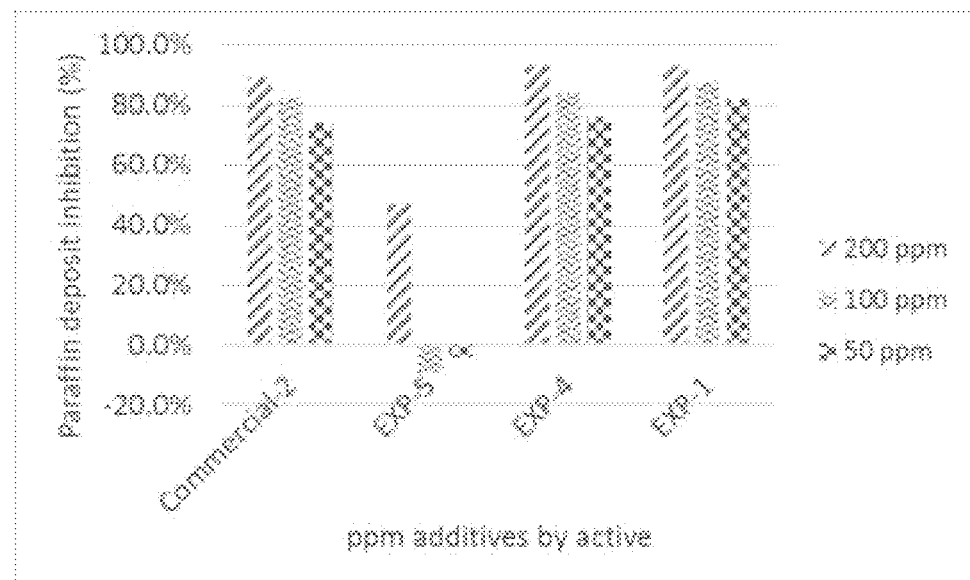
FIG. 5 is a graph providing results of an illustrative embodiment of the disclosed technology.
Figure 6:
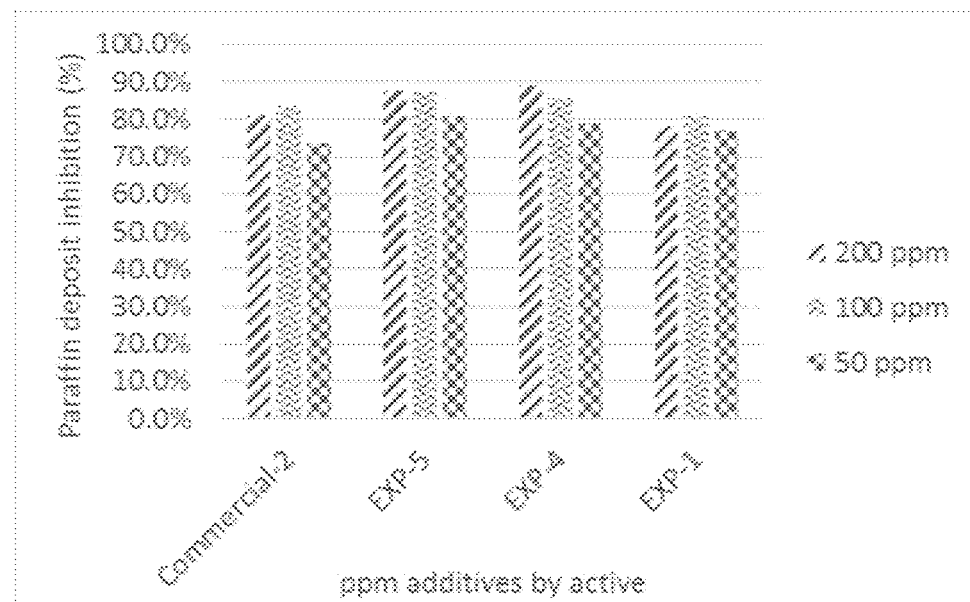
FIG. 6 is a graph providing results of an illustrative embodiment of the disclosed technology.

Additionally, the maleic anhydride copolymers with the dispersed ester side chains (i.e. broadly distributed side chains) and compositions thereof as provided by the present disclosure perform in surrogate oils with heavy or light wax content, the surrogate oil with heavy wax is characterized as 5% Wako44 wax+5% Wako68 wax in D60/A150 (7/3 v/v), the surrogate oil with light wax is characterized as 4.5% Aldrich53 wax+0.5% SinoPec80 wax in D60/A150 (7/3 v/v). FIGS. 5-6 provide the results for benefit of the broadly dispersed side chain of experimental chemicals in surrogate oils, containing a heavy wax and a light wax. FIG. 5 provides results in a heavy wax and FIG. 6 provides results in a light wax. The polymers with broadly dispersed side chains (EXP-4, EXP-1) work robustly on the surrogate oil containing heavy wax, as well as the surrogate oil containing of light wax. FIG. 1 shows the side chain Cn distribution, and the results showed that the polymer with C14-26 side chains (EXP-5, which are dispersed narrower than EXP 1&4) only perform well in the light waxy oil.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A wax inhibitor composition, the composition comprising:
at least one alpha-olefin maleic anhydride copolymer of the formula

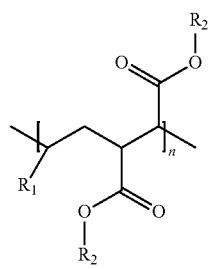

wherein $R_1$ is selected from hydrocarbyl groups containing 10-30 carbon atoms, and $R_2$ is selected from a hydrogen or hydrocarbyl groups containing 10-80 carbon atoms, wherein $R_2$ comprises a weight fraction of carbon numbers greater than 30, and the other $R_2$ can be the same or different, and wherein if $R_2$ is hydrogen, the other $R_2$ is different, and n is a number of repeating units ranging from 1 to 100.

2. The wax inhibitor composition as recited in claim 1, wherein the at least one alpha olefin maleic anhydride copolymer is prepared by reacting an alpha-olefin containing greater than 10 carbon atoms with maleic anhydride in the presence of a free radical initiator to obtain a copolymer, followed by reacting the copolymer with an alcohol mixture having a dispersed chain length ranging from 10 to 80 carbon atoms.

3. The wax inhibitor composition as recited in claim 2, wherein the alpha-olefin comprises a range of about 10-30 carbon atoms.

4. The wax inhibitor composition as recited in claim 2, wherein the alpha-olefin is 1-octadecene, 1-eicosene, 1-docosene, 1-tetracosene, 1-hexacosene, 1-octacosene, 1-hexadecene, 1-tetradecene, or 1-dodecene.

5. The wax inhibitor composition as recited in claim 2, wherein the alcohol mixture contains more than 25% by weight of alcohols in the alcohol mixture contain greater than 35 carbon atoms.

6. The wax inhibitor composition as recited in claim 2, wherein the alcohol mixture has a dispersed chain length ranging from (i) C10-C60, (ii) C20-C70, or (iii) C30-C80.

7. The wax inhibitor composition as recited in claim 2, wherein the alcohol mixture comprises a linear aliphatic alcohol containing more than 25% by weight of alcohols in the alcohol mixture contain greater than 35 carbon atoms.

8. A comb polymer composition, the composition comprising:
at least one alpha olefin maleic anhydride copolymer of the formula:

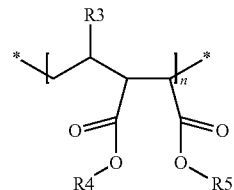

wherein $R_3$ is selected from hydrocarbyl groups containing 10-40 carbon atoms, and $R_4$ is selected from a hydrogen or hydrocarbyl groups containing 10-80 carbon atoms, and $R_4$, if not hydrogen, comprises a weight fraction of carbon numbers greater than 30, $R_5$ is selected from a hydrogen or hydrocarbyl groups containing 10-80 carbon atoms, and $R_5$, if not hydrogen, comprises a weight fraction of carbon numbers greater than 30, wherein $R_4$ and $R_5$ are the same or different, and when either $R_4$ or $R_5$ is hydrogen, $R_4$ and $R_5$ are different, and n is a number of repeating units ranging from 1 to 100, wherein the at least one alpha olefin maleic anhydride copolymer is prepared by reacting an alpha-olefin or alpha-olefin mixture with a chain length of greater than 10 carbon atoms with a dicarboxylic acid to obtain a copolymer, followed by reacting the copolymer with an alcohol mixture in the presence of a catalyst, wherein the alcohol mixture contains a fully saturated, linear primary alcohol, having a dispersed chain length ranging from 10 to 80 carbon atoms and wherein at least 14% by weight of the alcohol mixture comprises greater than 35 carbon atoms.

9. The comb polymer composition as recited in claim 8, wherein the alpha-olefin or alpha-olefin mixture comprises a chain length of greater than 24 carbon atoms.

10. The comb polymer composition as recited in claim 9, wherein the alpha-olefin is 1-octadecene, 1-eicosene, 1-docosene, 1-tetracosene, 1-hexacosene, 1-octacosene, or 1-hexadecene, 1-tetradecene, 1-dodecene, or C30-54 olefin.

11. The comb polymer composition as recited in claim 9, wherein the dicarboxylic acid is maleic anhydride.

12. The comb polymer composition as recited in claim 9, wherein the alcohol mixture contains more than 25% by weight of alcohols in the alcohol mixture contain greater than 35 carbon atoms.

13. The comb polymer composition as recited in claim 9, wherein the alcohol mixture has a dispersed chain length ranging from (i) C10-C60, (ii) C20-C70, or (iii) C30-C80.

14. The comb polymer composition as recited in claim 9, wherein the alpha-olefin has a chain length of between 24-28 carbon atoms and the alcohol mixture has a dispersed chain length of greater than 25 carbon atoms.

15. The comb polymer composition as recited in claim 9, wherein the alpha-olefin has a chain length of greater than 30 carbon atoms and the alcohol mixture has a dispersed chain length of greater than 30 carbon atoms.

16. The comb polymer composition as recited in claim 9, wherein the alpha-olefin has a chain length of greater than 30 carbon atoms and the alcohol mixture has a dispersed chain length of greater than 40 carbon atoms.

17. The comb polymer composition as recited in claim 8, wherein the comb polymer composition is used to effectively treat crudes comprising long waxes containing greater than 40 carbon atoms.

18. The comb polymer composition as recited in claim 8, wherein either $R_4$ or $R_5$ is hydrogen.

19. A method of reducing wax deposition from an oil, the method comprising:

adding to the oil an effective amount of a wax inhibitor composition comprising at least one alpha olefin maleic anhydride copolymer, wherein the at least one alpha olefin maleic anhydride copolymer is prepared by reacting an alpha-olefin containing greater than 10 carbon atoms with maleic anhydride in the presence of a free radical initiator to obtain a copolymer, followed by reacting the copolymer with an alcohol mixture having a dispersed chain length ranging from 10 to 80 carbon atoms, wherein the alcohol mixture contains a fully saturated, linear primary alcohol and at least 14% by weight of the alcohol mixture comprises greater than 35 carbon atoms, wherein the at least one alpha olefin maleic anhydride copolymer of the formula:

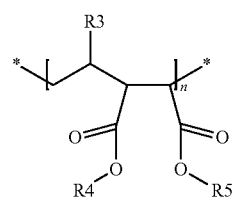

wherein $R_3$ is selected from hydrocarbyl groups containing 10-40 carbon atoms, and $R_4$ is selected from a hydrogen or hydrocarbyl groups containing 10-80 carbon atoms, and $R_4$, if not hydrogen, comprises a weight fraction of carbon numbers greater than 30, $R_5$ is selected from a hydrogen or hydrocarbyl groups containing 10-80 carbon atoms, and $R_5$, if not hydrogen, comprises a weight fraction of carbon numbers greater than 30, wherein $R_4$ and $R_5$ are the same or different, and when either $R_4$ or $R_5$ is hydrogen, $R_4$ and $R_5$ are different, and n is a number of repeating units ranging from 1 to 100.

20. The method as recited in claim 19, wherein the alcohol mixture contains more than 25% by weight of alcohols in the alcohol mixture contain greater than 35 carbon atoms.

21. The method as recited in claim 19, wherein the oil comprises long waxes containing greater than 40 carbon atoms.

22. The method as recited in claim 19, wherein the weight percent of the copolymer in the wax inhibitor composition is in a range from 0.1% to 100%.

23. The method as recited in claim 19, wherein the oil comprises a wax content of 0.1% to 100% by weight.

24. The method as recited in claim 19, wherein the oil is a crude oil having a wax content of 0.1% to 100%.

25. The method as recited in claim 24, wherein the weight percentage of the wax inhibitor in the crude oil is in a range from 0.001% to 1%.

* * * * *